Jan. 19, 1965  H. L. HAGLER  3,166,349
PERCOLATOR BASKET AND STEM REMOVING TOOL
Filed July 22, 1963
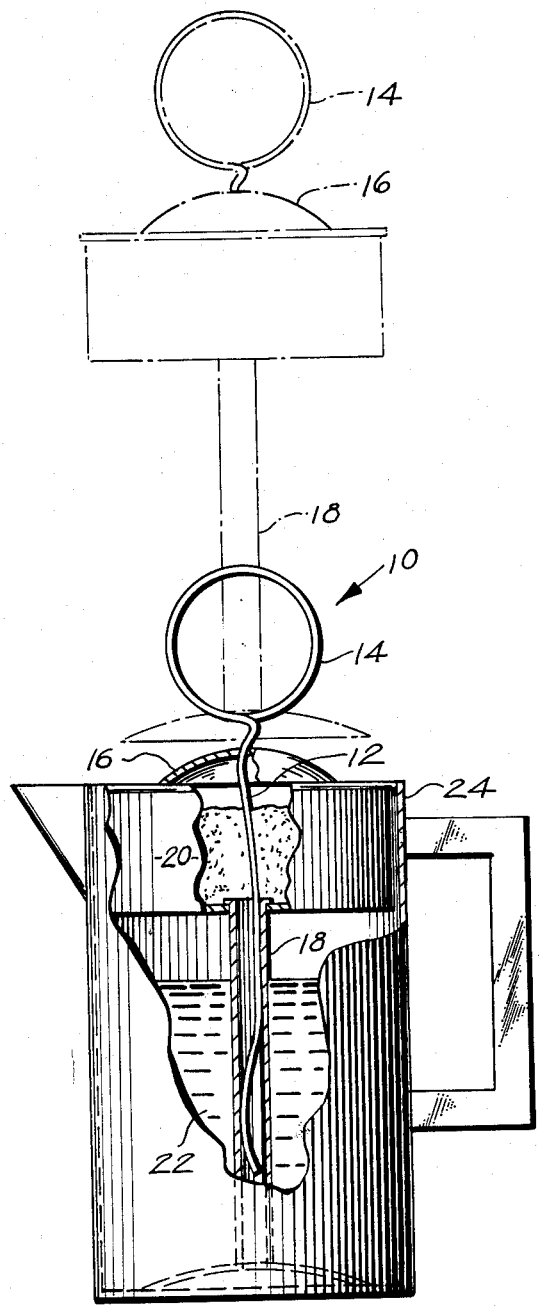
FIG.1
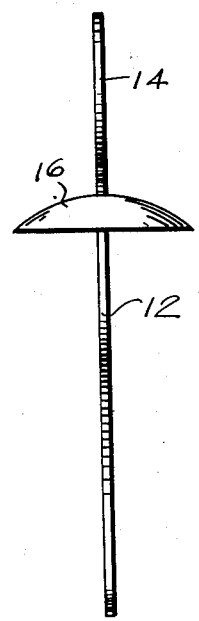
FIG.2
FIG.3
INVENTOR.
H.L. HAGLER United States Patent Office 3,166,349
Patented Jan. 19, 1965

---

3,166,349
PERCOLATOR BASKET AND STEM REMOVING TOOL
Herbert L. Hagler, 2312 W. Dengar St., Midland, Tex.
Filed July 22, 1963, Ser. No. 296,768
1 Claim. (Cl. 294—33)

This invention relates to devices for use in the kitchen and more particularly to a tool for removing the basket and stem of a percolator.

It is a primary object of the present invention to provide a tool for removing the basket and stem containing coffee grounds from within a coffee pot, while the contents of the pot are hot.

Another object of the present invention is to provide a tool for coffee pots which will have a convenient handle means for inserting the device into the basket of coffee grounds and down through the stem that will frictionally retain the basket and stem so that they may be lifted upwardly and out of the coffee pot.

A further object of the present invention is to provide a kitchen tool for coffee pots which will have a concave shield beneath the handle to protect the user from being scalded in the event hot coffee shoots upwardly when the device is in use.

Other objects of the invention are to provide a kitchen tool for coffee pots bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a front view of the present invention shown in operative use;

FIG. 2 is a top plan view of the device shown removed from the percolator; and

FIG. 3 is a view taken along the lines 3—3 of FIG. 2.

Referring to the drawing, a percolator basket and stem removing tool 10 made in accordance with the present invention is shown to include a wire 12 made of spring steel or other suitable material, having a shallow bent S-configuration at its lower end and its upper end is bent into a circular loop 14 providing handle grip means for tool 10. A concave circular shield 16 is fixedly secured beneath loop 14 and provides protection for the operator's hand if the hot coffee should boil upwardly toward loop 14. Shield 16 serves to deflect the liquid downwardly into the coffee grounds. The shallow S-shaped end of wire 12 is frictionally received within the hollow stem 18 beneath the basket 20 and springingly encroaches upon the inner periphery of stem 18, thus providing a positive holding action so that the operator may lift basket 20 in stem 18 clear. The end of wire 12 extends below the surface of coffee 22 within coffee pot 24, thus providing a maximum holding by friction within stem 18.

In operation, the user grasps loops 14 in one hand and holds the handle of the coffee pot 24 securely in the other hand and lifts upwardly thus removing basket 20 and stem 18 from within coffee pot 24.

When inserting tool 10, the user grasps the tool by loop 14 in one hand and with the other hand holds the handle of coffee pot 24 and inserts the shallow S-shaped end of wire 12 down into the coffee grounds contained within basket 20 and continues to urge downward until it is sufficiently far down to provide a positive hold.

It will be noted that tool 10 may be made of various materials and may be formed in a variety of designs, thus providing a decorative and novel appearance to the device.

While various changes may be made in the detail construction, it shall be understood that such changes shall be within the spirit and scope of the present invention as defined by the appended claims.

What I claim as new and desire to protect by Letters Patent of the United States is:

A tool for removing the basket and stem from within a hot coffee pot comprising in combination a shallow S-shaped wire of stainless steel, a concave circular shield carried by said wire providing protection for the user from hot coffee which may rise during the removal of a basket and stem from a coffee pot, a circular loop bent in the upper end of said wire for receiving the finger of a person providing means for lifting said tool, said S-shaped end of said wire being receivable through coffee grounds within a basket of a coffee pot and being frictionally receivable within hollow bore of a stem of a coffee pot providing means for lifting a basket and stem from within the interior of a coffee pot, said S-shaped end of said wire adapted to springingly engage and encroach upon the inner periphery of a stem to frictionally secure said tool within a stem, said tool comprising a wire with a rectangular cross sectional configuration, said corners of said rectangular configuration of said wire providing multi-points of contact within the bore of a stem to increase the holding action of said tool within a stem and providing a non-slip grip therewith, and said shield centrally receiving said wire therethrough, said shield providing a means for deflecting said hot coffee away and downwardly if it should spurt upwardly during the removal of a basket and stem.

References Cited by the Examiner

UNITED STATES PATENTS

| | | | |
|---|---|---|---|
| 157,165 | 11/74 | Ellsworth | 294—33 |
| 1,176,781 | 3/16 | Schoon | 294—131 X |
| 1,816,904 | 8/31 | Heimroth | 294—61 |

SAMUEL F. COLEMAN, *Primary Examiner.*